Patented May 9, 1944

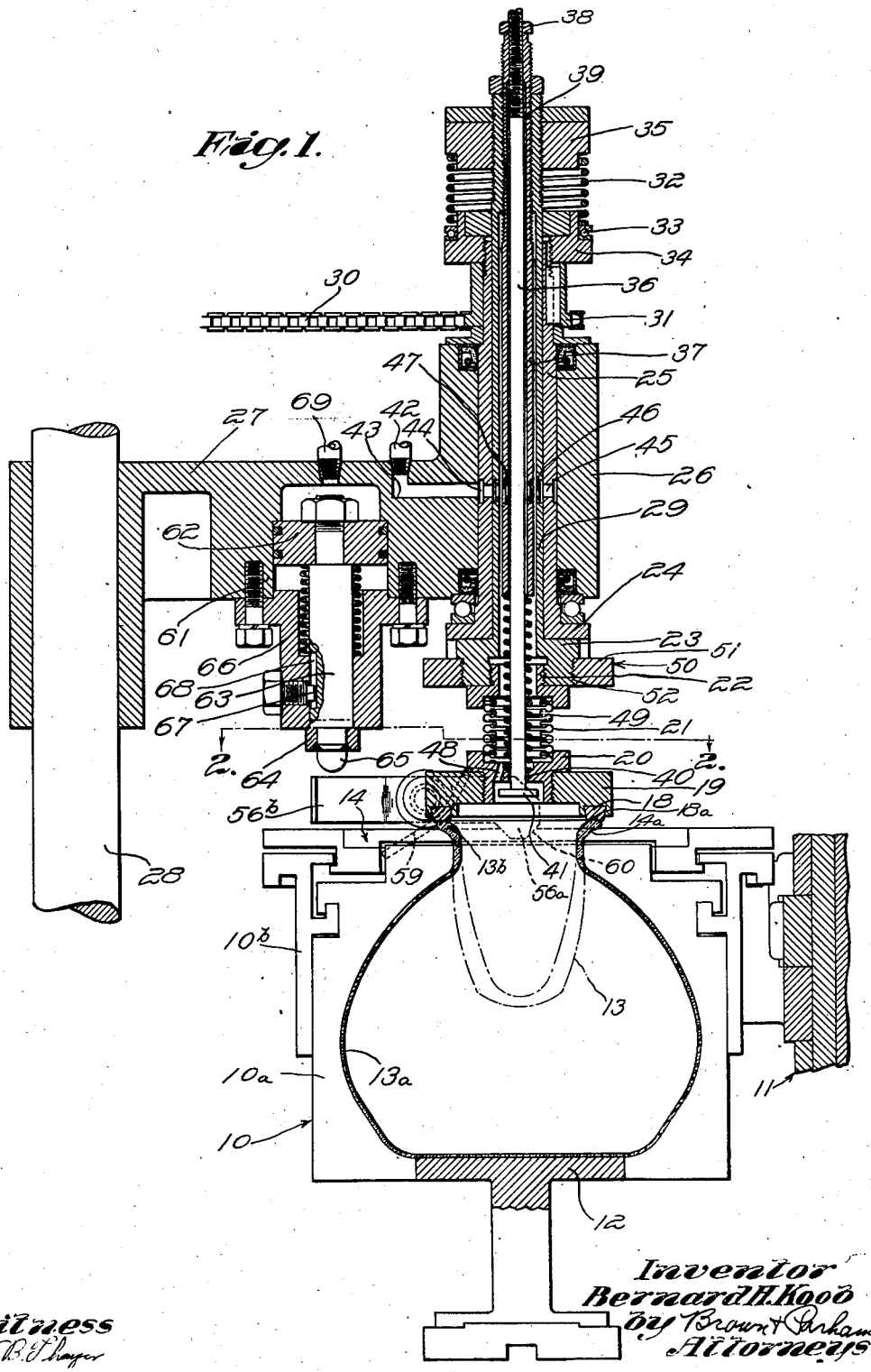

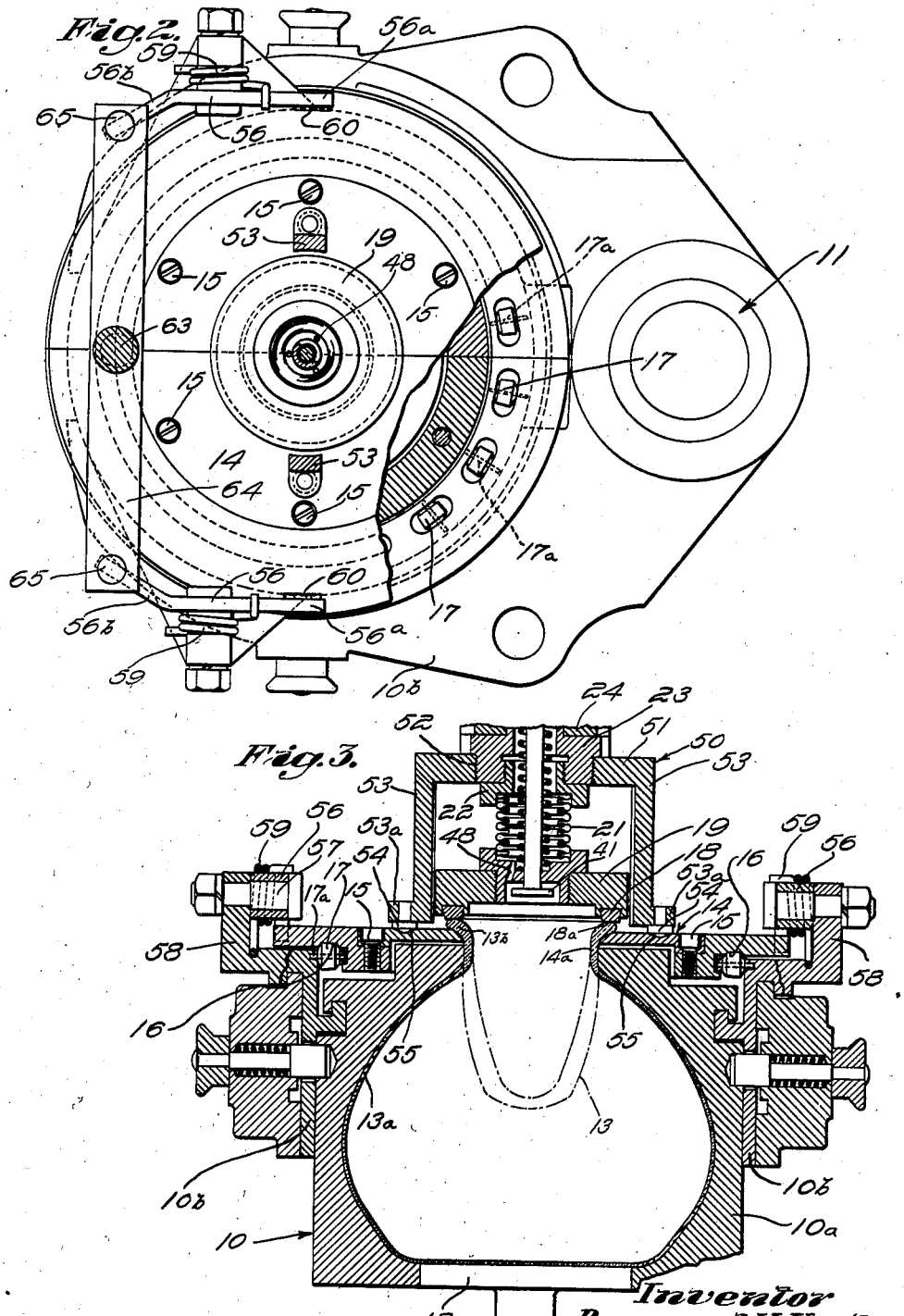

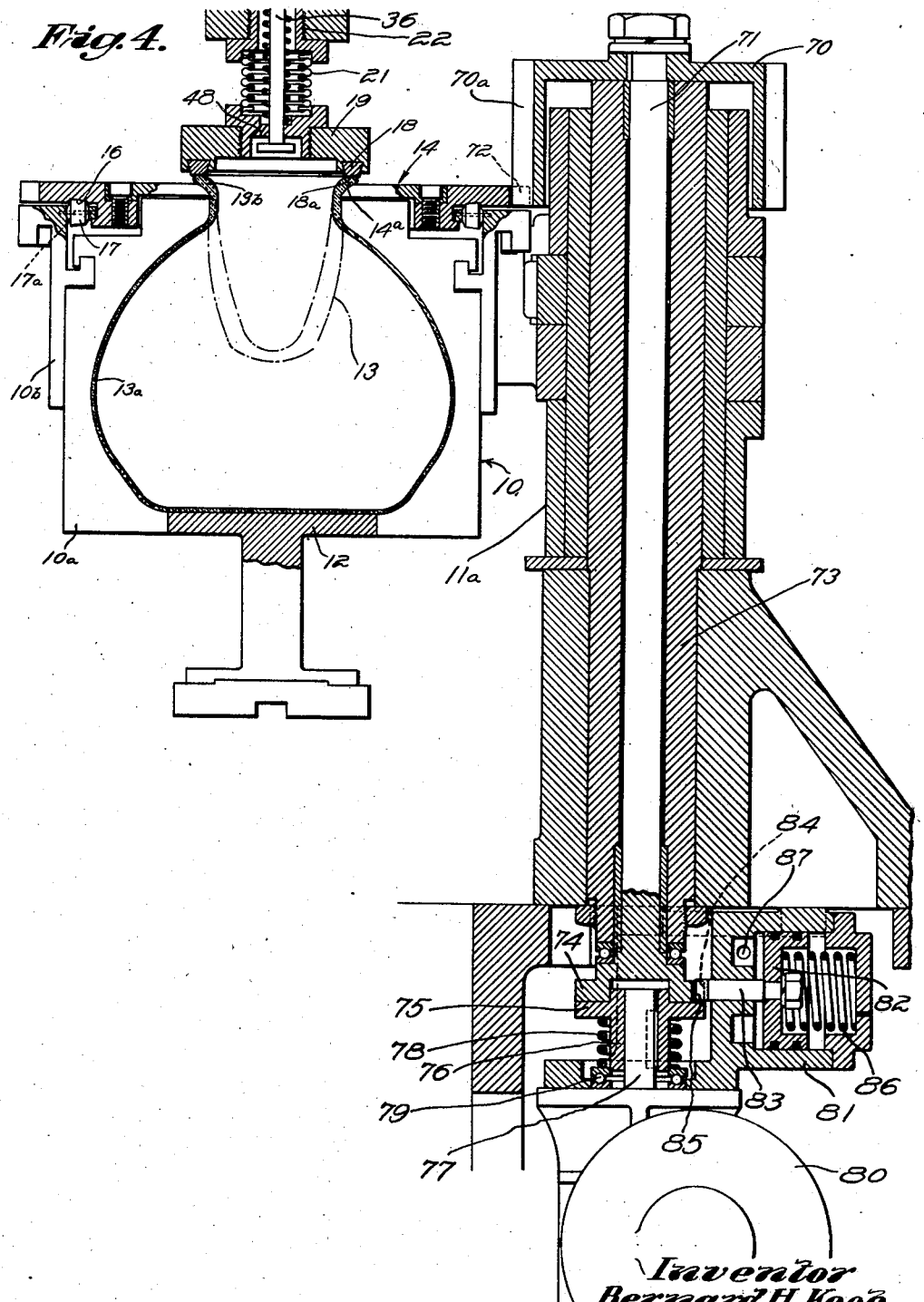

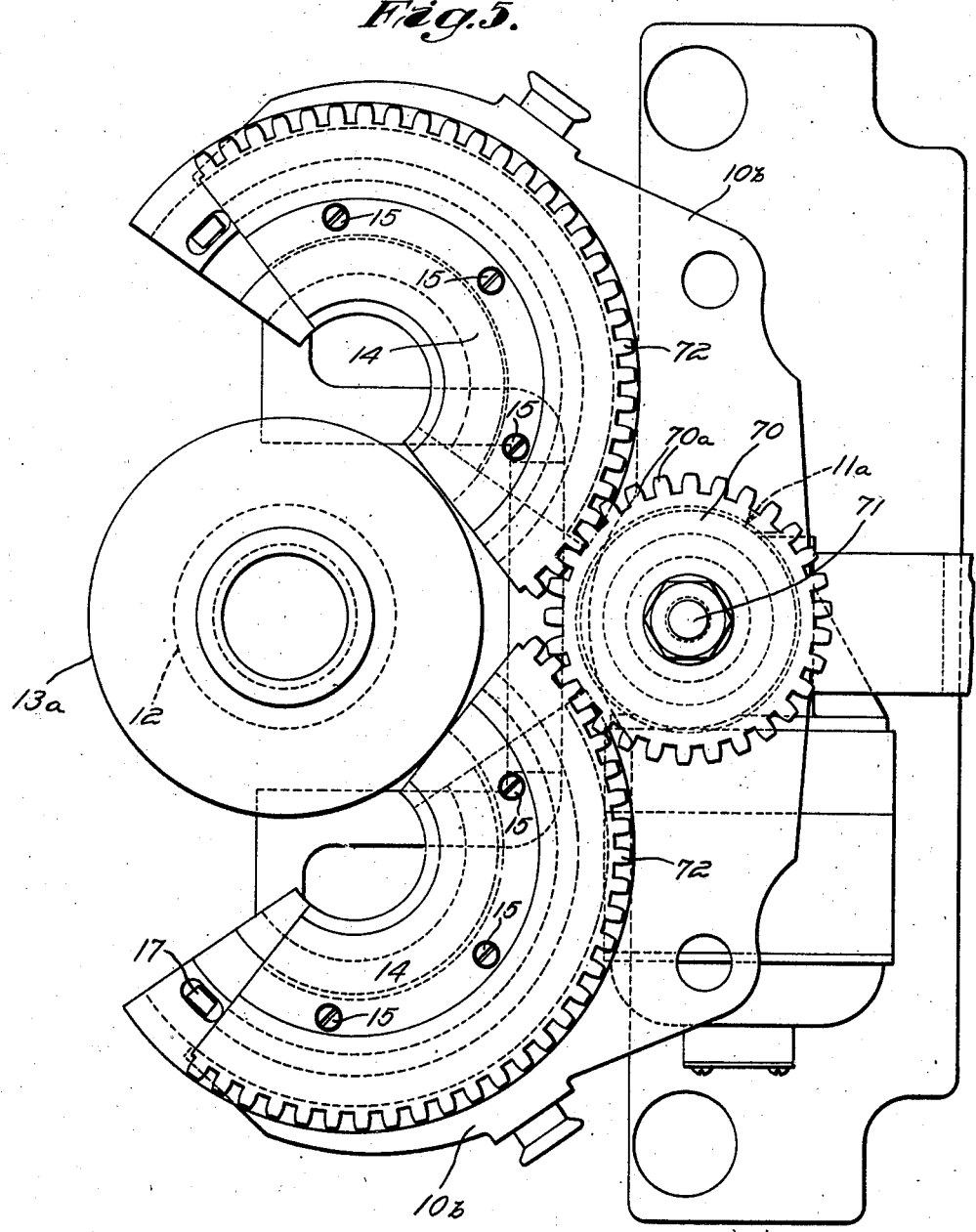

2,348,347

UNITED STATES PATENT OFFICE 2,348,347

PASTE MOLD MACHINE FOR FORMING HOLLOW GLASS BLANKS INTO FINALLY BLOWN ARTICLES

Bernard H. Koob, West Hartford, Conn., assignor to Hartford-Empire Company, Hartford, Conn., a corporation of Delaware Application September 5, 1942, Serial No. 457,414

12 Claims. (Cl. 49—18)

This invention relates to the manufacture of hollow glass articles, and more particularly to the manufacture of such articles as jars, bowls, tumblers and the like by the use of a machine which includes means for blowing hollow blanks or parisons to final form in a paste mold and for effecting relative rotation between the paste mold and the blank or parison therein during the blowing operation.

An object of the invention is to provide an efficient machine of relatively simple construction for acting upon hollow blanks or parisons which may have been produced by the blank or parison forming mechanism of a glass forming machine of the "hot mold" type, such, for example, as the well known Hartford I. S. forming machine, and for forming such hollow blanks or parisons in a blow mold or blow molds of the paste mold type to form the glass article or articles desired.

A further object of the invention is the provision in a machine of the character described of a novel means for firmly holding a slightly protruding open end or finish portion of a hollow blank or parison in a paste mold and for rotating such blank or parison in the mold during the blowing of the blank or parison to final form.

A further object of the invention is to provide a machine of the character described having a novel means adapted to grip the open end or finish portion of a hollow glass blank or parison in a paste mold and to rotate such blank or parison in the mold without marring the portion of the blank or parison that has been gripped whereby such portion may form a part of the finally blown article and need not be cracked off or otherwise removed as is usual in the manufacturing of paste mold ware.

A further object of the invention is the provision of a machine of the character described having a paste mold comprising openable and closable halves and a cooperative means for gripping a protruding portion of and rotating a hollow glass blank or parison in the paste mold, such means including a clamping ring mounted on the closed paste mold around the protruding portion of the blank or parison and made of openable and closable halves together with means for rotating them on the paste mold when they are closed and for permitting them to be opened by the mold halves when the latter are opened.

A further object of the invention is the provision of a machine of the character described having a novel means for gripping a protruding open end or finish portion of a hollow blank or parison in a paste mold and for rotating the blank or parison and having a novel cooperative means for applying blowing air to the interior of the rotating hollow blank or parison in the mold.

Other objects and advantages of the invention will hereinafter be pointed out or will become apparent from the following description of two illustrative practical embodiments of the invention as shown in the accompanying drawings, in which:

Figure 1 is a vertical section through a machine embodying the invention and including a paste mold and one form of means for rotating a hollow blank or parison in the paste mold and for blowing such blank or parison to final form therein;

Fig. 2 is a horizontal section through the machine of Fig. 1, substantially along the line 2—2 of Fig. 1, with a portion of the underlying structure broken away;

Fig. 3 is a transverse vertical section through the paste mold and adjacent parts of the machine, the view being generally on a plane extending substantially at a right angle to that of Fig. 1 but showing in section certain parts which would not appear in a true section on that plane;

Fig. 4 is a vertical section through a second embodiment of the same invention, including the paste mold and a different structural arrangement for rotating a hollow blank or parison in the paste mold and for applying blowing air thereto; and Fig. 5 is a plan view of the paste mold unit and of parts of the associate blank or parison gripping and rotating means of the form of device shown in Fig. 4 as they appear in open positions.

A machine of the invention either in the form shown in Fig. 1 or that shown in Fig. 4 may include a paste mold generally designated 10 which may comprise a pair of halves 10a carried by holders 10b. These holders may be pivotally connected to a vertical support 11, Figs. 1 and 2, or 11a, Figs. 4 and 5, to be swung about the axis of their vertical support to open and close their supported paste mold halves. A bottom plate 12 may be associated with the paste mold to close the cavity thereof at its bottom when the paste mold is closed. The bottom plate may be supported in any suitable known manner for cooperation with the paste mold halves as intended. Any suitable means for swinging the holders for the halves of the paste mold about their pivotal axis to open and close the mold at the proper times in the operation of the machine may be employed.

The paste mold assembly, comprising the openable and closable mold halves and a cooperative bottom plate, may be suitably located for the delivery thereto from a parison forming mechanism (not shown) of a hollow glass blank or parison suitable to be blown in the paste mold to form a hollow glass article of the shape desired. Thus, a hollow glass blank or parison such as that shown in part in dot-and-dash lines at 13 in each of Figs. 1, 3 and 4, may have been delivered to the paste mold assembly shown in each of these views and blown therein to form an article 13a of the final form desired. The particular article shown is suitable for use as a coffee maker but it may be formed to have a different shape and to be adapted for a different use.

The blank or parison forming mechanism may be that of any suitable known or preferred forming machine. I prefer to use the parison forming mechanism of a forming machine of the Hartford I. S. type, an example of which is shown in the Ingle Patent 1,911,119, of May 23, 1933. The blank or parison forming mechanism of such a machine may include or have associated therewith a suitable transfer mechanism for transferring the hollow glass blank or parison to the paste mold assembly. The hollow blank or parison may have an outwardly turned or externally beaded open end, rim or finish portion, represented by that shown at 13b in Figs. 1, 3 and 4, by which the hollow blank or parison may be suspended within the paste mold assembly for blowing out against the walls of the molding cavity and for rotation about its vertical axis by mechanism of the present invention as hereinafter will be further explained. The portion 13b of the hollow blank or parison has already been formed to have substantially the shape and size desired for the finally blown article. This portion may protrude slightly above the cavity of the paste mold when the main body portion of the blank or parison depends within such cavity, substantially as shown.

The present invention provides two cooperative clamping members of annular or ring form for clamping between themselves the protruding open end or finish portion of the hollow glass blank or parison in the paste mold. One of these clamping members, indicated generally at 14 in the drawings, is rotatably mounted upon the paste mold so as to encircle and contact at its inner periphery with the protruding open end or finish portion of the hollow blank or parison in the paste mold, as beneath the externally beaded or flaring extremity of that portion of the blank or parison as indicated at 14a in Figs. 1, 3 and 4. A novel feature of the clamping member 14 is that it is made in halves, like the paste mold, and that while it may be rotated on the paste mold when the latter is closed, its rotation is controlled so that stoppage thereof will leave the halves thereof suitably positioned for opening and closing movements with the halves of the paste mold and the mounting of the member 14 on the paste mold is such that opening and closing of the halves of the latter will also open and close the halves of the former. A further novel feature of the clamping member 14 is that the inner or glass engaging portion of each of the halves thereof is detachably secured, as by cap bolts 15, Figs. 2, 3 and 5, to the remainder of that half and may be removed and replaced by an inner or glass engaging portion having a different shape and/or size at its inner or glass contact edge. By substituting inner portions of the halves thereof as required, the clamping member 14 may be adapted to encircle and closely contact differently sized and differently shaped open end or finish portions of different hollow blanks or parisons at different times.

The member 14 is provided at its under surface with a circular groove or channel 16, Figs. 3 and 4, which may be concentric with the inner peripheral or glass engaging edge of such member and is formed in part in each of the halves thereof. Freely rotatable rollers 17, Figs. 2, 3 and 4, are suitably supported by radial pins or axles 17a carried by the mold holders 10b so that their upper peripheral portions extend into the groove or channel 16 against the bottom of the latter. By this arrangement, the closed halves of the member 14 may turn or rotate in unison on the closed halves of the paste mold 10 about the vertical axis of the latter. The means just described for mounting the clamping member 14 on the paste mold is of the anti-friction bearing type so that the rotation of the former on the latter may be effected easily and without substantial friction. At the same time, the mounting is such as to prevent accidental lateral bodily movement of the member 14 as an entity relative to the paste mold when the latter is closed or radial movement of either of the halves of the member 14 relative to its supporting half of the paste mold when rotation of the member 14 has been stopped. The rollers 17 may be of the frusto-conical type, in which event the bottom of the groove or channel 16 will be appropriately inclined in a radial direction to match the slope of the peripheries of the rollers.

The second clamping member of the blank or parison neck clamping device of the present invention as hereinbefore generally described may be a one piece ring such as that indicated at 18 in Figs. 1, 3 and 4. It is contemplated that the clamping member 18 will be carried by a suitably operated movable carrier by which it will be brought at the proper time to bear against the open end or finish portion of a hollow blank or parison in the paste mold at a surface of the latter that is opposite the surface in contact with the annular member 14. When, as shown in Figs. 1, 3 and 4, the member 14 encircles the neck of the hollow blank or parison beneath an outwardly flaring or enlarged extreme upper end portion thereof, the member 18 may bear at its lower surface, as at 18a, against the upper surface of such extreme upper end portion of the hollow blank or parison. If the shape of the open upper end or finish portion of a hollow blank or parison in a paste mold of a machine of the present invention should require or make desirable, the members 14 and 18 may bear against opposed outer and inner surfaces of such upper end or finish portion of the blank or parison.

In each of the illustrative embodiments of the invention shown in the drawings, the clamping ring 18 is carried by an assembly of structural elements which together constitute a movable blow head mechanism by which blowing air is supplied to the interior of the hollow blank or parison in the paste mold at the proper time to blow out the walls of the blank or parison against the paste mold walls. While these blow head mechanisms are alike in the main, they have some differences and hence will be separately described.

Referring first to the structure of the form of the machine shown in Figs. 1 to 3, inclusive, it will be noted that the clamping ring 18 is partially set into a groove in the lower surface of a carrying ring 19, see Figs. 1 and 3, which constitutes the bottom member of the blow head mechanism. The clamping ring 18 depends below the lower surface of the carrying ring 19 so as to seat firmly against the upper surface of the outwardly flaring open upper end portion of the hollow blank or parison in the paste mold when the blow head mechanism has been lowered from a higher out-of-the-way position (not shown) to its blowing position as shown.

The annular bottom member 19 of the blow head structure is connected by an annular coupling 20 to the lower end of a vertically expansible and contractile flexible tube 21. The latter may be made of thin spring metal that has been suitably formed to provide peripheral corrugations, substantially as shown. The tube 21 is connected at its upper end by an upper coupling 22 to a driven friction clutch plate 23. The latter is in frictional contact at its upper surface with a driving friction clutch plate 24 that is driven continuously by means presently to be described.

As shown, the friction clutch plate 24 has an upwardly extending tubular stem 25 mounted anti-frictionally within a vertical bearing sleeve 26 at the outer end of an arm 27. The arm 27 may be carried by a vertical rod 28 which may be appropriately moved by suitable means (not shown) to effect the desired movements of the blow head in relation to the paste mold for the glassware forming operations to be performed. The means for moving the rod 28 may be like that disclosed in the aforesaid Ingle Patent 1,911,119 for operating the final blow head arm supporting rod 261 of the forming machine of that patent. The driven friction clutch plate 23 has an upwardly extending tubular stem 29 journaled in the tubular stem 25 and projecting upwardly beyond the upper end of the latter. A driver, represented by the sprocket chain 30 is operatively connected to the stem 25, as through the sprocket wheel 31, to rotate the stem 25 and the friction drive plate 24 continuously, as aforesaid.

A coil spring 32 is disposed between an annular bearing unit 33 on a nut 34 that is carried by the upper end portion of the stem 25 and a nut 35 that is carried by the upper end portion of the inner stem 29 and tends to maintain the driven friction clutch plate 23 in good frictional contact with the driving friction plate 24. The pressure applied by the spring 32 may be adjusted by adjustment of the nut 35 to increase or diminish the compression of the spring 32.

A vertical rod 36 extends through the assembly of parts of the blow head mechanism as so far described. A tubular coupling 37 is in threaded engagement at 38 with an upper portion of the rod 36 and at 39 with the stem 29 and thus suspends the rod 36 in the blow head assembly. The rod extends downwardly through the longitudinally expansible and contractile tube 21 and through a central opening 40 in the coupling member 20, being provided at its lower extremity with a head or enlarged portion 41. When the blow head structure is raised to lift the clamping member 18 from its clamping position, the tubular member 21 may be expanded longitudinally until the coupling member 20 strikes the head 41 of the rod 36.

A blowing air supply pipe 42 may be connected to the arm 27 in communication with a passage 43 therein. This passage communicates with a peripheral groove 44 in the stem 25. The groove 44 communicates through radial passages 45 in the stem 25 with passages indicated at 46 in the stem 29 and thence with passages indicated at 47 in the inner tubular member 37 so that pressure fluid supplied by the pipe 42 to the blow head assembly may pass downwardly therein to and through a discharge passage 48 in the lower coupling member 20 and thence to the interior of the glass blank or parison in the paste mold. A coil spring 49 may be disposed around the lower end of the rod 36 between the lower end of the tubular member 37 and the lower coupling member 20 and may exert pressure on the latter so as to tend to maintain the clamping ring 18 pressed firmly against its seat on the upper end portion of the glass blank or parison in the paste mold when the blow head mechanism is in its lowered blowing position as shown.

In the machine of the Fig. 1 form of construction, the clamping member 14 is rotated by a final driving member 50, Fig. 3, that is rotated by the driven friction member 23. The member 50 has an annular head portion 51, Figs. 1 and 3, adjustably connected by screw threads 52 to the friction member 23. The head 51 carries a pair of depending legs 53, Fig. 3, having outturned lower end portions 53a carrying depending coupling elements 54 adapted to fit into suitably shaped recesses 55 in the halves of the clamping member 14 when the blow head assembly has been lowered to its blowing position as shown. The coupling elements 54 are shown as being downwardly tapering heads at the lower ends of pins carried by the parts 53a and the recesses 55 as being shaped to accommodate this type of coupling element. The member 50 may be turned on the driven member 23 if required to assure proper engagement of the coupling elements 54 with the walls of the recesses 55 to effect rotation of the clamping member 14 in unison with the driven member 23.

A means for breaking the driving connection between the continuously rotating friction member 24 and the clamping member 14 so that the rotation of the latter will be stopped when desired will now be described. Such a means may comprise a pair of pawls 56 which are pivotally mounted on horizontally disposed short shafts or pins 57 carried by upturned lugs or ears 58 on the holders 10b for the halves of the paste mold. See Figs. 2 and 3. The pawls 56 are acted on continuously by torsion springs 59 which tend to maintain the working or latching ends 56a of the pawls continuously engaged with notches or recesses 60 in the respective halves of the clamping member 14. The notches 60 are located suitably to cause the rotation of the clamping member 14 to be stopped when the parting line between the halves of such member is parallel or nearly parallel with the parting line between the halves of the paste mold or in other words, so that the halves of the member 14 can open with the halves of the paste mold. The engagement of the pawls with the notched or recessed portions of the halves of the member 14 will hold these halves against rotation firmly enough to overcome the friction between the continuously rotating driving member 24 and the associate driven member 23.

A means for disengaging the pawls from the halves of the member 14 and for holding the pawls in their raised, inactive position may comprise a vertically disposed pneumatic cylinder 61, carried by the arm 27 and, in the present instance, formed in part in that arm. A piston 62 is reciprocable in the cylinder 61 to reciprocate vertically a depending piston rod 63, the lower end portion of which carries a cross bar 64, Figs. 1 and 2. The cross bar 64 has depending pawl-actuating contact members 65 which, as best seen in Fig. 2, are located over tail pieces 56b of the pivoted pawls 56. Thus, when the piston 62 is moved from the upper end of its stroke in the cylinder 61 to the lower end of such cylinder, the consequent lowering of the cross bar 64 and of the contact members 65 carried thereby will force the tail pieces 56b of the pivoted pawls 56 downwardly, the working or latching ends 56a of such pawls thereby being raised out of engagement with the notches 60 in the halves of the clamping member 14. A coil spring 66 may be provided within the cylinder around the piston rod to urge the piston 60 continuously toward the upper end of its cylinder, as to the position shown in Fig. 1. A fixed guiding pin 67 may be provided to work in a longitudinal slot 68 in the piston rod 63 to prevent accidental turning of the piston rod about its vertical axis from the position desired. This of course is the position in which the cross bar 64 is supported with the contact members 65 directly above the tail pieces of the pivoted pawls. The downward stroke of the piston 62 in the cylinder 61 may be caused at the proper time in the cycle of operations of the machine by supplying a pressure fluid to the cylinder above the piston 62, as from a pipe 69, to drive the piston downwardly against the resistance of the coil spring 66.

The operation of the form of machine that has been described in detail will be readily understood. Assuming that this machine has been located suitably for cooperation with the hollow blank or parison forming mechanism of a selected forming machine, such, for example, as the Hartford I. S. forming machine hereinbefore referred to, the halves of the paste mold and the halves of the clamping plate 14 may be closed while the blow head mechanism is in a raised position out of the way of the means (not shown) by which a hollow blank or parison is to be delivered to the paste mold. Such a hollow blank or parison, when delivered, will hang pendant within the paste mold from the closed clamping ring 14. Lowering of the blow head mechanism will position the clamping ring 18 in cooperative relation with the clamping ring 14 so that the protruding open upper end or finish portion of the glass blank or parison will be firmly held between these two clamping members. The lowering of the blow head mechanism to its blowing position will also establish the driving connection between the clamping member 14 and the continuously rotating driving member 24. The pawls then may be actuated to release the halves of the clamping member 14 so that this member, together with the rotatably mounted parts of the blow head and the glass blank or parison will be rotated in unison. This rotation may take place during the application of blowing pressure through the blow head structure to the interior of the hollow blank or parison to blow it to final form in the blow mold. Thereafter, the pawls may be released so that they will engage the notches in the halves of the clamping member 14, thereby stopping rotation of the latter when the halves of such clamping member are in positions to be opened by the opening of the halves of the paste mold. The blow head structure may have been raised concurrently with or just before the opening of the halves of the paste mold and the finally formed article may be removed from the bottom plate of the blow mold assembly by any suitable means.

In the embodiment of the invention shown in Figs. 4 and 5, the clamping member 14 is directly driven. The blow head mechanism of this form of the device therefore need not include driving means but may otherwise be substantially like the hereinbefore particularly described blow head mechanism of the Fig. 1 form of construction. It is intended that the clamping ring 18 shall be moved relative to the clamping member 14 and rotated in unison therewith about the same axis when these clamping members are clamped against opposite surfaces of the protruding open end or neck portion of a hollow blank or parison in the paste mold and any blow head mechanism suitable for the accomplishment of these results may be used to carry the clamping ring 18 in the Fig. 4 form of machine. The blow head mechanism of this form of machine is shown only in part in the drawings, the illustrated members thereof being indicated by the same reference numerals as were used for like parts of the blow head mechanism of the Fig. 1 form of construction.

The means for rotating the clamping member 14 of the machine of Figs. 4 and 5 may comprise a driving gear 70 carried by a vertical shaft 71 and having teeth 70a in mesh with teeth 72 in the outer edges of the halves of the clamping member 14. The vertical shaft 71 is anti-frictionally mounted in a vertical tubular bearing 73 in the aforesaid vertical column 11a on which the holders for the halves of the paste mold are pivotally mounted. The shaft 71 carries, at its lower end, a friction driven disk 74. A cooperative continuously rotating friction drive disk 75 is carried by a sleeve 76 which is feathered to a short vertical shaft 77 that is disposed below and in axial alignment with the shaft 71. A coil spring 78, located between an anti-friction bearing unit 79 and the driving disk 75, urges the latter continuously against the driven disk 74. The shaft 77 is driven continuously by a suitable prime mover, such as the motor 80.

A pneumatic cylinder 81 is located at one side of and adjacent to the driven disk 74. A piston 82 is reciprocable in the cylinder 81 for operating a piston rod 83. The latter carries a detent 84 adapted to enter and engage with a notch 85 in the edge of the disk 74 when the piston 82 is at the end of its stroke in the cylinder 81 toward the disk 74. A compression spring 86 may be provided in the cylinder 81 between the end of the cylinder remote from the disk 74 and the piston to urge the piston 82 constantly toward the disk 74. When the detent 84 is in engagement with the notch in the edge portion of the driven disk 74, the rotation of the disk 74 will be stopped. The notch 85 is suitably located in the edge of the disk 74 to stop rotation of the shaft 71 and hence of the halves of the closed clamping member 14 so that these halves can open with the halves of the paste mold, as to the positions shown in Fig. 5. When it is desired to permit rotation of the closed clamping member 14, air may be applied to the cylinder 81 between the piston 82 and the end of the cylinder next to the disk 74 to drive the piston 82 toward the opposite end of the cylinder against the resistance of the spring 86 and to maintain the piston in that position while the rotation of the clamping member 14 is taking place. Release of this air, which may be supplied and exhausted through suitable connections, not shown, with a port 87 in the cylinder wall, will permit return of the piston to position to cause the disk 74 to be latched against rotation.

The invention is not limited to the details of the illustrative embodiments thereof shown in the drawings and hereinbefore described as many modifications thereof and changes therein will readily occur to those skilled in the art.

I claim:

1. In a glassware forming machine, the combination with a blow mold having a cavity therein open at one end of the mold, of clamping means mounted to rotate at said end of the mold independently of the latter about the extended axial line of the mold cavity, said clamping means comprising a plurality of members movable relatively to each other to and from positions at which they cooperate to grip the open end or finish portion of a hollow glass blank or parison having a body portion located within said mold cavity so as to rotate said blank or parison in said mold cavity when said clamping means is rotated as aforesaid, means including a continuously rotating driving member to rotate said clamping means when the relatively movable members thereof are in their cooperative positions as aforesaid, and means operable to automatically stop rotation of said clamping means after a predetermined period of rotation thereof while said driving member continues to rotate.

2. In a glassware forming machine, the combination with a blow mold having a cavity open at one end of the mold, an annular clamping member rotatably mounted adjacent to said end of said mold in position to encircle and contact at its inner edge with the neck portion of a hollow glass blank or parison having a body portion disposed within said cavity of the mold, a second clamping member movable axially toward and from said end of said mold to and from position to seat against a surface of said neck portion of said hollow blank or parison opposite that in contact with said first named clamping member, means for rotating said clamping members in unison relative to said blow mold to rotate said hollow blank or parison in said blow mold, and means for introducing blowing air into said hollow blank or parison during its rotation in said blow mold.

3. In a glassware forming machine, the combination with an upright blow mold made in two openable and closable halves and having a cavity therein open at the upper end of the mold when said halves are closed, an annular clamping member having an inner edge formed to encircle and contact with the outer surface of the neck portion of a hollow blank or parison to support the body of said blank or parison within the cavity of said blow mold when said clamping member is located in a position adjacent to the upper end of said mold and in axial alignment therewith, means for rotatably supporting said annular clamping member in its said position relative to said blow mold, a vertically movable blow head mechanism for supplying blowing air to the interior of said hollow blank or parison in said blow mold, and a rotatable clamping ring carried by said blow head mechanism in position to be seated on a surface of the neck portion of said hollow blank or parison opposite to that encircled by said first-named clamping member when said blow head structure is in position to apply blowing air to the interior of the hollow blank or parison in said blow mold.

4. In a glassware forming machine, a blow mold comprising a pair of openable and closable halves, a clamping ring comprising a pair of openable and closable halves, means for mounting said clamping ring on one end of said blow mold to rotate relative to said blow mold in axial alignment therewith, said clamping ring being adapted to encircle the neck portion of a hollow glass blank or parison to support the body of the blank or parison within said blow mold, means for rotating said clamping ring relative to said blow mold to rotate the blank or parison in the mold, and means for controlling the rotation of said clamping ring to stop automatically each cycle of rotation thereof when the halves of the clamping ring are in positions to permit opening movements of the halves of the blow mold.

5. In a glassware forming machine, a blow mold comprising a pair of openable and closable halves, a clamping ring comprising a pair of openable and closable halves, means for mounting said clamping ring on one end of said blow mold to rotate relative to said blow mold in axial alignment therewith, said clamping ring being adapted to encircle the neck portion of a hollow glass blank or parison to support the body of the blank or parison within said blow mold, means for rotating said clamping ring relative to said blow mold to rotate the blank or parison in the mold, and means for controlling the rotation of said clamping ring to stop automatically each cycle of rotation thereof when the halves of the clamping ring are in positions to permit opening movements of the halves of the blow mold, the means for mounting said clamping ring on said mold being constructed and arranged to cause opening of the halves of the clamping ring with the halves of said blow mold.

6. In a glassware forming machine, a blow mold comprising a pair of openable and closable halves, a clamping ring comprising a pair of openable and closable halves, means for mounting said clamping ring on one end of said blow mold to rotate relative to said blow mold in axial alignment therewith, said clamping ring being adapted to encircle the neck portion of a hollow glass blank or parison to support the body of the blank or parison within said blow mold, means for rotating said clamping ring relative to said blow mold to rotate the blank or parison in the mold, means for controlling the rotation of said clamping ring to stop automatically each cycle of rotation thereof when the halves of the clamping ring are in positions to permit opening movements of the halves of the blow mold, a spring pressed member adapted to bear against a surface of the neck portion of said blank or parison opposite to that in contact with said clamping ring, and means for mounting said spring pressed member for rotation with said blank or parison when said member is in position to bear against said surface and for moving the spring pressed member to and from said position.

7. In a glassware forming machine, a blow mold comprising a pair of openable and closable halves, a clamping ring comprising a pair of openable and closable halves, means for mounting said clamping ring on one end of said blow mold to rotate relative to said blow mold in axial alignment therewith, said clamping ring being adapted to encircle the neck portion of a hollow glass blank or parison to support the body of the blank or parison within said blow mold, means for rotating said clamping ring relative to said blow mold to rotate the blank or parison in the mold, means for controlling the rotation of said clamping ring to stop automatically each cycle of rotation thereof when the halves of the clamping ring are in positions to permit opening movements of the halves of the blow mold, a second clamping ring adapted to seat against a surface of the neck portion of the hollow blank or parison supported by said first-named clamping ring in opposing relation to the latter, and means to move said clamping ring axially relative to said mold to and from said seat and for mounting such clamping ring to rotate with the hollow blank or parison when seated thereagainst.

8. In a glassware forming machine, an upright blow mold having a cavity therein open at the top of the mold, said blow mold comprising a pair of openable and closable halves, a clamping ring comprising a pair of openable and closable halves, means for rotatably supporting said clamping ring at the upper end of said blow mold for rotation relative to said blow mold, means for rotating said clamping ring on the mold when the halves of both the mold and the clamping ring are closed, and means effective automatically to stop the rotation of said clamping ring at a time in its cycle of rotation when the parting line between the halves of the clamping ring will approximately match the parting line between the halves of the blow mold.

9. In a glassware forming machine, the combination of an upright blow mold having a cavity open at the upper end of the mold, means for supporting a hollow blank or parison in position to depend within the mold and to project at its open upper end above the mold cavity, a clamping ring, a vertically movable blow head mechanism cooperative with the mold and comprising an assembly of connected annular members defining an internal passage for blowing air and including an intermediately located tubular body member of flexible and longitudinally expansible and contractile construction and a ring carrier connected to the lower end of said tubular body member and carrying said clamping ring, and spring means tending to maintain said tubular body expanded to yieldingly press said clamping ring against the open upper end portion of said hollow blank or parison when said blow head mechanism has been lowered to position to apply blowing air to the hollow blank or parison in the mold.

10. In a glassware forming machine, the combination with an upright paste mold having a cavity open at the top of the mold and comprising a pair of separable halves, a hollow blank or parison neck encircling annular clamping plate comprising a pair of separable halves to match the halves of said mold, means for rotatably mounting said clamping plate at the upper end of said mold in position to suspend said hollow blank or parison in said mold, a cooperative clamping ring adapted to be seated against the neck end portion of said hollow blank or parison in cooperative relation with said annular clamping plate, means for moving said cooperative clamping ring to and from its seated position, for yieldingly pressing it against its seat at that position and for permitting it to rotate in unison with the hollow blank or parison, means for rotating said annular clamping plate, comprising a continuously rotating friction disk and motion transmitting connections between said continuously rotating disk and said annular clamping plate, including a disk to be driven by frictional contact with said continuously rotating disk, and means adapted to be actuated to stop the rotation of said annular clamping plate by said motion transmitting connections when the halves of the annular clamping plate are in predetermined positions in respect to the halves of said mold and while said first named disk continues to rotate.

11. In a glassware forming machine, an upright blow mold open at its upper end and comprising a pair of separable halves, a hollow blank or parison neck encircling annular clamping plate comprising a pair of separable halves to match the halves of the blow mold, means for rotatably mounting said clamping plate on said mold in position to suspend a hollow blank or parison in the mold, means for rotating said clamping plate, comprising a vertically movable blow head mechanism located above the mold and adapted for cooperation with the hollow blank or parison in the mold, said blow head mechanism including a continuously rotating friction disk, a rotatably mounted friction disk in contact with the first disk, and a motion transmitting member carried by the second disk and having portions engageable with the halves of said clamping plate when the blow head mechanism is in a lowered position in respect to the mold to rotate said clamping plate, and latching means having elements movable from positions out of contact with the halves of the clamping plate to positions in engagement therewith to stop the rotation of the clamping plate when the halves thereof are in positions to be separated from each other with the halves of the blow mold.

12. In a glassware forming machine, an upright blow mold open at its upper end and comprising a pair of separable halves, a hollow blank or parison neck encircling annular clamping plate comprising a pair of separable halves to match the halves of the blow mold, means for rotatably mounting said clamping plate on said mold in position to suspend a hollow blank or parison in the mold, means for rotating said clamping plate, comprising a continuously rotating friction disk, a friction disk driven by the first disk, a pinion operatively connected to the second disk to rotate therewith, said pinion being geared to the halves of said clamping plate, a movable latching element, and means for moving said latching element from a position out of contact with the second disk to position to engage therewith to stop its rotation to cause the rotation of the clamping plate to stop when the halves of said plate are in positions to open with the halves of said mold.

BERNARD H. KOOB.